June 9, 1959     I. N. CLEMENSEN     2,890,042
PIPE SUPPORTING AND ALIGNING FIXTURE
Filed Jan. 4, 1956     2 Sheets-Sheet 2

INVENTOR.
IRA N. CLEMENSEN
BY Elliott & Pastoriza
ATTORNEYS

United States Patent Office 2,890,042
Patented June 9, 1959

2,890,042
PIPE SUPPORTING AND ALIGNING FIXTURE
Ira N. Clemensen, Los Angeles, Calif.
Application January 4, 1956, Serial No. 557,290
5 Claims. (Cl. 269—104)

This invention generally relates to a pipe supporting and aligning fixture and more particularly to a fixture for holding soil pipe sections while joints are being packed, pored, and corked.

Although the invention will be illustratively described with respect to operations involved in joining together different sections and/or fittings of soil pipe, it will be appreciated that the features of the invention are equally adaptable with slight modification to other types of pipe designs and to other types of pipe connecting operations, particularly where axial alignment between two sections of the pipe is important. Such operations would include, for example, welding and the installation of coupling devices.

The preparation of joints to secure together two sections of soil pipe has been for some time a troublesome operation in view of the necessity of bringing about axial alignment of the two sections while at the same time coping with the unwieldy and bulky structure of this particular type of pipe. Certain efforts have been made to develop jigs and supporting structures adapted to properly position the sections while the joining operations are being accomplished. However, most of these devices are of a relatively complex nature, and not readily susceptible of disassembling or assembling at different work locations.

Another difficulty presented with present day apparatus for holding soil pipe is the fact that usually two men are required in order to properly assure accurate axial alignment of the different sections while the joining operation is being performed. In consequence, the packing, poring and corking of soil pipe while the joints are being formed, under conventional practice, continues to be a labor and time consuming operation.

It is, therefore, an object of the present invention to provide a pipe supporting and aligning fixture which is simple in construction and which may be readily disassembled and carried from one location to another for expeditious reassembly.

Another object of the present invention is to provide a fixture for aligning and supporting pipe which, when in use for pipe connecting operations, enables the pipe to be so disposed as to permit the operations to be performed by only one man.

A still further object of the present invention is to provide such a fixture which is durable and rugged, and which may be less expensively manufactured than other fixtures, jigs, supports, and the like presently available on the market.

These and other objects and advantages of the present invention are generally attained by providing a fixture comprising an elongated member disposed in a given plane. A first plug means is coupled to the member and adapted to receive one end of one of the pipe sections being joined. Similarly, a second plug means is coupled to the member at a different axial location and is adapted to receive one end of another of the pipe sections being joined.

With such a construction the unplugged ends of the two sections are positioned, by properly locating the respective plug means, adjacent each other in opposing relationship whereby the particular pipe joining operation may be conveniently performed. The respective plug means function not only to keep the two sections of soil pipe in axial alignment, but also serve to support the pipe sections with respect to the elongated member.

In a preferred embodiment, the fixture is additionally provided with a means for firmly holding at least one section of pipe in a given axial position as determined by the disposition of the respective plug means. For this purpose, a V block in conjunction with a shock cord or other flexible member may be used.

A better understanding of the invention will be had by reference to the accompanying drawings, showing a preferred embodiment for illustrative purposes, in which.

Figure 1:
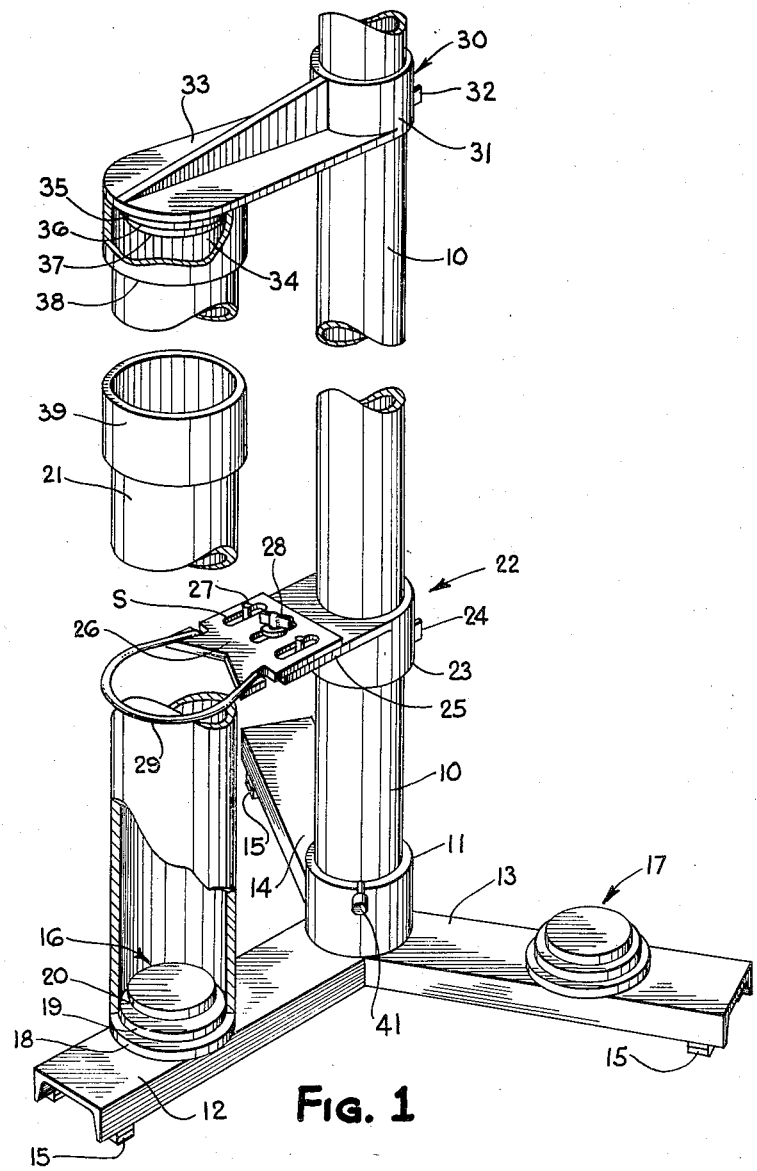
Figure 1 is a perspective view of the pipe aligning and supporting fixture of the present invention with pipe sections disposed thereon.

In Figure 1 there is shown a cylindrical stem 10 which is adapted to be threadedly engaged with or otherwise connected to a circular base member 11. Radially extending from and below the base member 11 are a plurality of arms 12, 13 and 14, respectively, provided with supports 15. If necessary, the supports 15 may be of different thicknesses or each of adjustable thickness whereby the arms may be leveled with respect to each other so as to stably hold the stem 10 on the base 11, regardless of the variations in the contour of the ground, flooring or other area where the fixture is disposed.

On the arm 12 is provided a plug means 16 comprised of three disc-like members 18, 19 and 20 superimposed one on top of the other. The upper disc 20 is designed to have a diameter substantially equivalent to that of the inner diameter of a two-inch soil pipe; similarly, the intermediate disc 19 has a diameter equivalent to that of the inner diameter of a three-inch soil pipe and the lower disc 18 to that of a four-inch soil pipe.

The plug means 17 provided on the arm 13 is correspondingly dimensioned to suitably receive the hub end of a two-inch, three-inch or four-inch soil pipe. It will be appreciated that the plugs 16 and 17 may be formed of any number of superimposed disc-like members having diameters most appropriate to the particular requirements of the desired application of the fixture.

Disposed on the plug 16 is a soil pipe section 21 being illustratively shown of the three inch size to fit over the disc 19. An upper portion of the pipe section 21 is adapted to be held against a pipe holder 22. The pipe holder 22 includes an annular collar section 23 axially and circumferentially retained by a set screw 24 on the stem 10 from which extends a stationary section 25 having mounted thereon a movable V block 26. The V block 26 is provisioned for slidable positioning on the section 25 through a plurality of slots S permitting limited movement of the block 26 with respect to pins 27 extending upwardly from the section 25. One of the pins may be threaded and provided with a shoulder wing nut, as shown at 28. With such an arrangement, the V block 26 may be moved into position against the pipe section 21 and the nut 28 thereafter tightened to clamp the block 26 with respect to the section 25 and thereby establish a given axial position of that portion of the pipe section 21 with respect to the stem. To further supplement the action of the V block 26, a shock cord, spring, or other flexible member 29 may be drawn tightly around the stem 10 and the pipe section 21 thereby enabling a more secure arrangement.

The pipe stem 10 additionally has coupled to it an upper plug retainer 30 having a collar section 31, and a set screw 32 for axially positioning the retainer on the stem 10. Extending from the collar 31 is a plug support 33 on which are mounted plug means 34. The plug means 34 are normally provided with different circular cross sections 35, 36, and 37 corresponding with the cross sections of discs 18, 19, and 20 disposed on the arm 12. Thus, under normal working conditions, the plug means will accommodate the hub end of a pipe section 38, as shown.

The pipe section 38 is shown as disposed on the intermediate disc 36 and extends downwardly therefrom to be supported within a collar 39 disposed on the upper end of lower pipe section 21.

In operation, the stem 10 and the base 11 with the attached arms 13, 14 and 15, may be separately carried from one location to another. When two pipe sections are to be joined, the stem 10 may be threaded into the base 11 and the supports 15 positioned so as to solidly secure the stem 10 in a vertical or nearly vertical position. Thereafter, the pipe section 21 is positioned on the corresponding disc 19, and the pipe holder 22 is axially and circumferentially adjusted by the set screw 24 with respect to the particular length of the pipe section 21. The V block 26 on the pipe holder 22 may then be slidably moved inwardly or outwardly so as to come into engaging contact with the pipe section 21 and thereafter firmly clamped by the nut 28.

At this time the upper pipe section 38 may be inserted into the collar 39 and supported therein while the plug retainer 30 is slid down into position so that its disc section 36 will be disposed in the upper end of the pipe section 38. The set screw 32 may then be screwed into the retainer in this established position. The packing, poring and corking operations may then be commenced.

Figure 2:
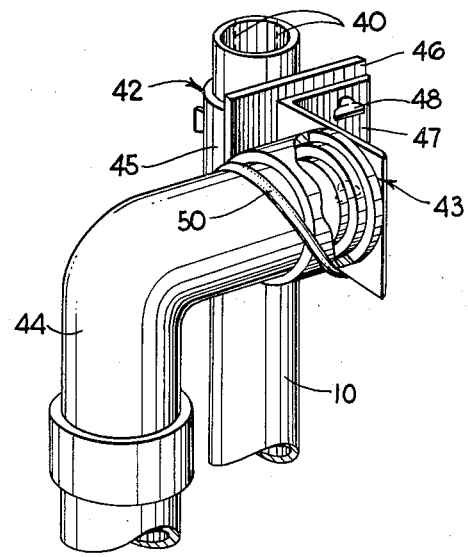
Figure 2 is a view of a modified form of the upper plug retainer.

In order to more precisely position the retainer 30 and the pipe holder 22, two scribe lines 40, as shown in Figure 2, are desirably impressed in the surface of the stem running lengthwise and spaced about the outer periphery of the stem. Thus, the set screws 32 and 24 may correspondingly be lined up with a particular scribe line 40 to assure that the holder 22 and 31 will be disposed so as to have the respective plug means 34 and 16 in axial alignment. In this regard, for example, a pin 41 may be provided in the base 11 to project into a positioning hole in the stem 10, whereby the scribe lines 40 will be caused to be aligned in the same vertical planes, respectively, with the plug means 16 and 17.

In Figure 2, there is shown a modified plug retainer 42 adapted to be used in addition to or in place of the plug retainer 30 (shown in Figure 1) in joining together pipe sections, where one of these sections terminates in a bend or where one of the sections is a fitting in the terminology of the art. The retainer 42 is provided with plug means 43, similar in construction to plug means 34, shown in position for alignment with pipe section 44 having one end formed in a bend.

Figure 3:
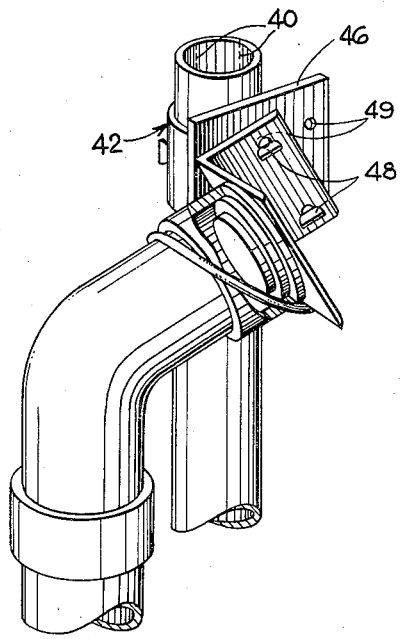
Figure 3 is a view of the retainer of Figure 2 disposed in another position.

The retainer 42 includes a collar section 45 and a side plate 46 to which is attached a plug holder 47. The plug holder 47 is held to the side plate 46 through a bolt 48 which may be disposed in any one of a plurality of apertures 49 (seen more clearly in Figure 3) in the side plate 46. With such an arrangement, depending upon the angle of the bend of the pipe section 44, the bolt 48 may be positioned into a particular aperture 49 so that the plug means 43 will be angularly rotated in a plane parallel to the side plate 46 to a position corresponding with the particular angle of the bend of the pipe section 44. Thus, in Figure 3 the retainer 42 of Figure 2 is shown with the plug means 43 in a different angular position than that of Figure 2, as a consequence of the bolt 48 being inserted in a different aperture 49 than that employed in Figure 2.

In order to firmly secure the pipe section 44 in positive engagement with the retainer 42, a shock cord 50 or the like, similar to the flexible member 29 of Figure 1, may be employed as shown.

It will be apparent that although the pipe aligning and supporting fixture of the present invention has been described in conjunction with its application in a substantially vertical position, it may readily be used in a horizontal position with slight structural modifications. In addition, although only two sections of pipe have been shown positioned for connection, it is feasible that more sections could be joined in successive steps. For example, the retainer 30 could be used to join sections 21 and 38; thereafter, retainer 30 could be removed from the stem 10 or else placed in a non-operative position. Retainer 42 could then be placed on the stem and used to join a pipe section 44 of the bend type to the previously connected sections.

It is, consequently, evident that many changes and modifications may be made within the spirit and scope of the invention with respect to the embodiment shown only for illustrative purposes. From the foregoing description, it will be seen that the pipe aligning and supporting fixture of the present invention may be simply and economically fabricated and yet will adequately comply with the requirements of convenient, rugged, and versatile use for pipe joining operations.

What is claimed is:

1. A pipe supporting and aligning fixture comprising, in combination: a base including a plurality of radially extending arms in a given horizontal plane, said arms being adapted to rest on a supporting surface; a cylindrical stem adapted to have one end centrally secured to and supported on said base and its other end extend vertically therefrom; leveling means associated with said arms, respectively, whereby the outer ends of said arms, respectively, may be raised or lowered with respect to said horizontal plane to accommodate variations in the contour of said supporting surface and thus align said stem with the vertical; a first retaining means secured to at least one of said arms; a second retaining means adapted to be secured to said stem; plug means on said first and second retaining means for receiving the opposite ends of two pipe sections to be aligned; means on said stem for vertically aligning said first retaining means and said second retaining means; and adjusting means for vertically and horizontally adjusting said second retaining means so that adjacent ends of said pipe sections are axially in alignment.

2. A pipe supporting and aligning fixture according to claim 1, in which said adjusting means includes means for angularly adjusting the plug means associated with said second retaining means with respect to the vertical, such that said second retaining means is adapted to secure a bent end of one of said two pipe sections in such position that its free end is in axial alignment with the adjacent end of the other of said two pipe sections.

3. A pipe supporting and aligning fixture according to claim 1, in which said plug means comprises a plurality of co-axially disposed disc plugs adapted to be received in corresponding diameter pipe sections.

4. A pipe supporting and aligning fixture comprising, in combination: a base including a plurality of radially extending arms in a given horizontal plane, said arms being adapted to rest on a supporting surface; a cylindrical stem adapted to have one end centrally secured to and supported on said base and its other end extend vertically therefrom; leveling means associated with said arms, whereby the outer ends of said arms, respectively, may be raised or lowered with respect to said horizontal plane to accommodate variations in the contour of said supporting surface and thus align said stem with the vertical; a first retaining means secured to at least one of said arms; a second retaining means adapted to be secured to said stem; plug means on said first and second retaining means for receiving the opposite ends of two pipe sections to be aligned; said second retaining means including a collar; a side plate rigidly tangentially secured to said collar; a plug holder having one portion thereof in parallel relationship with said plate; means for rotatively angularly positioning and securing said one portion to said plate; said plug holder having another portion extending normally from said one portion, said another portion retaining the plug means associated with said second retaining means.

5. A pipe supporting and aligning fixture according to claim 4, including rectilinear scribe lines on said stem whereby said first and second retaining means may be aligned with respect to each other.

References Cited in the file of this patent

UNITED STATES PATENTS

| | | |
|---|---|---|
| 1,465,330 | Ardner | Aug. 21, 1923 |
| 1,987,294 | Haskins | Jan. 8, 1935 |
| 2,283,324 | Faber | May 19, 1942 |
| 2,323,039 | Hill | June 29, 1943 |
| 2,724,175 | Kjellberg | Nov. 22, 1955 |
| 2,774,134 | Smith et al. | Dec. 18, 1956 |
| 2,775,819 | Kalbow et al. | Jan. 1, 1957 |